United States Patent
Komatsubara et al.

(10) Patent No.: US 6,427,479 B1
(45) Date of Patent: Aug. 6, 2002

(54) REFRIGERATING DEVICE UTILIZING CARBON DIOXIDE AS A REFRIGERANT

(75) Inventors: Takeo Komatsubara, Kiryu; Yasuki Takahashi, Gunma-ken; Toshiyuki Ebara, Ota; Miyuki Kawamura, Gunma-ken, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/659,917

(22) Filed: Sep. 12, 2000

(30) Foreign Application Priority Data

| Mar. 10, 2000 | (JP) | 2000-066308 |
| Mar. 10, 2000 | (JP) | 2000-066309 |
| Mar. 10, 2000 | (JP) | 2000-066310 |

(51) Int. Cl.[7] .............................. F25B 43/00
(52) U.S. Cl. .................................. 62/503
(58) Field of Search .................. 62/474, 503, 114, 62/468; 252/68

(56) References Cited

U.S. PATENT DOCUMENTS

| 3,572,050 | A |   | 3/1971  | Bottum         |        |
| 4,028,431 | A |   | 6/1977  | Futami et al.  |        |
| 4,205,532 | A |   | 6/1980  | Brenan         |        |
| 4,474,018 | A |   | 10/1984 | Teagan         |        |
| 5,108,634 | A |   | 4/1992  | Seiki          |        |
| 5,557,944 | A |   | 9/1996  | Hirano et al.  |        |
| 5,711,165 | A | * | 1/1998  | Iizuka et al.  | 62/474 |
| 5,798,319 | A |   | 8/1998  | Schlosberg et al. |     |
| 5,887,441 | A | * | 3/1999  | Spauschus et al. | 62/84 |
| 6,000,233 | A |   | 12/1999 | Nishida et al. |        |
| 6,026,649 | A |   | 2/2000  | Adachi         |        |
| 6,029,459 | A |   | 2/2000  | Iizuka et al.  |        |
| 6,263,683 | B1 | * | 7/2001 | Tazaki         | 62/114 |

FOREIGN PATENT DOCUMENTS

| BE | 829 039       |    | 9/1975  |
| DE | 197 19 430    | C1 | 11/1998 |
| DE | 299 14 502    | U1 | 12/1999 |
| EP | 0 688 854     | A1 | 12/1995 |
| EP | 0 861 883     | A2 | 9/1998  |
| EP | 0 924 289     | A1 | 6/1999  |
| EP | 0 974 633     | A1 | 1/2000  |
| EP | 0 976 593     | A1 | 2/2000  |
| EP | 0 992 572     | A2 | 4/2000  |
| GB | 1602092       |    | 11/1981 |
| GB | 2 306 497     | A  | 5/1997  |
| JP | 10-265790     |    | 10/1998 |
| JP | 11-094380     |    | 4/1999  |
| JP | 11-236584     |    | 8/1999  |

* cited by examiner

*Primary Examiner*—William Doerrler
*Assistant Examiner*—Malik N. Drake
(74) *Attorney, Agent, or Firm*—Knobbe, Martens, Olson & Bear, LLP

(57) ABSTRACT

A refrigerating device is provided whose burden on the environment is small, and in which a high amount of heat can be removed, and in which return of refrigerating device oil to a compressor is good. In the refrigerating device, carbon dioxide is circulated as a refrigerant through a refrigerating circuit in which at least a refrigerant compressor, a heat releasing device, an expansion mechanism and an evaporator are connected in an annular arrangement by refrigerant pipes. The refrigerating device oil used in the compressor has a viscosity at 40° C. of 5 to 300 cSt, a volume specific resistivity of at least $10^8$ $\Omega \cdot$cm, and a pour point of no higher than −30° C. when the carbon dioxide is dissolved to saturation. Organic materials which do not physically and/or chemically change due to high-temperature, high-pressure carbon dioxide are used in the refrigerating circuit. The refrigerating circuit is provided with a device for trapping moisture within the refrigerating circuit.

23 Claims, 4 Drawing Sheets

F I G. 1
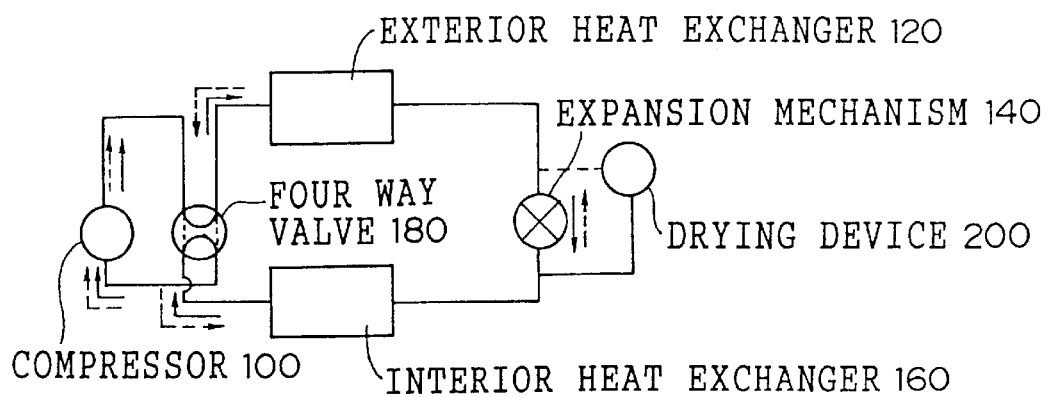

REFRIGERATING DEVICE UTILIZING CARBON DIOXIDE AS A REFRIGERANT

BACKGROUND OF THE INVENTION

1. Field of the Invention

The present invention relates to a refrigerating device, and in particular, to a refrigerating device which does not cause a large burden on the environment and which can remove a large amount of heat.

2. Description of the Related Art

Refrigerators, air conditioners, and refrigerating devices for automatic vending machines and showcases have usually used, as a conventional refrigerant, chlorofluorocarbon refrigerants such as dichlorodifluoromethane (CFC-12), or hydrochlorofluorocarbon refrigerants such as chlorodifluoromethane (HCFC-12). When these refrigerants are released into the atmosphere and reach the ozone layer above the earth, the problem of destruction of the ozone layer arises. Thus, use of chlorofluorocarbon flon and hydrochlorofluorocarbon flon, which are refrigerants which have been used until now in refrigerating devices, has been prohibited or restricted.

As a result, hydrofluorocarbon refrigerants such as $CH_2FCF_3$ (HFC-134a) have been used as a substitute flon of the above refrigerants. However, even with such HFC refrigerants, a problem arises in that the effect thereof on global warming, which is another global environmental issue, is near the same level as that of the conventional HCFC-22 ($CHClF_2$) which is an HCFC refrigerant.

Further, in refrigerating devices which are equipped with a hot-water supply function in addition to the functions of heating and cooling, the condensation temperature of a conventional refrigerant cannot be made high, and as a result, only heat of about 80° C. (the obtained hot water is about 50° C.) can be removed at the heat releasing device. It is impossible to remove a high heat amount of, for example, 120° C. (the obtained hot water is about 80° C.), and a supplementary heat source such as an electric heater or the like is used in order to raise the temperature of the hot water.

In this way, a refrigerating device which does not result in a large burden on the environment and which can remove a large amount of heat has not yet been realized.

SUMMARY OF THE INVENTION

In view of the aforementioned, an object of the present invention is to provide a refrigerating device which does not cause a large burden on the environment, which enables a large amount of heat to be removed, and in which the return of the refrigerating device oil to the compressor is good.

Another object of the present invention is to provide a refrigerating device which can be used stably over a long period of time.

Yet another object of the present invention is to provide a refrigerating device in which the generation of rust or the like which is caused by the water included in the refrigerating circuit can be prevented.

The following refrigerating devices of the present invention are provided in order to achieve the above-described objects.

(1) A refrigerating device in which carbon dioxide is circulated as a refrigerant in a refrigerating circuit in which at least a refrigerant compressor, a heat releasing device, an expansion mechanism, and an evaporator are connected in an annular arrangement by refrigerant pipes, wherein a refrigerating device oil used in the compressor has a viscosity at 40° C. of 5 to 300 cSt, a volume specific resistivity of $10^8$ $\Omega$·cm or more, and a pour point of -30° C. or less when the carbon dioxide is dissolved to saturation.

(2) A refrigerating device in which carbon dioxide is circulated as a refrigerant in a refrigerating circuit in which at least a refrigerant compressor, a heat releasing device, an expansion mechanism, and an evaporator are connected in an annular arrangement by refrigerant pipes, wherein a refrigerating device oil used in the compressor has a viscosity at 40° C. of 5 to 300 cSt, a volume specific resistivity of $10^8$ $\Omega$·cm or more, and a pour point of -30° C. or less when the carbon dioxide is dissolved to saturation, and organic materials used in the refrigerating circuit are materials which are not physically and/or chemically altered by high-temperature, high-pressure carbon dioxide.

(3) A refrigerating device in which carbon dioxide is circulated as a refrigerant in a refrigerating circuit in which at least a refrigerant compressor, a heat releasing device, an expansion mechanism, and an evaporator are connected in an annular arrangement by refrigerant pipes, wherein a refrigerating device oil used in the compressor has a viscosity at 40° C. of 5 to 300 cSt, a volume specific resistivity of $10^8$ $\Omega$·cm or more, and a pour point of -30° C. or less when the carbon dioxide is dissolved to saturation, and the refrigerating circuit includes a drying device for trapping moisture within the refrigerating circuit.

BRIEF DESCRIPTION OF THE DRAWINGS

FIG. 1 is a schematic view illustrating one example of a refrigerating circuit in the present invention.

DESCRIPTION OF THE PREFERRED EMBODIMENTS

Figure 2:
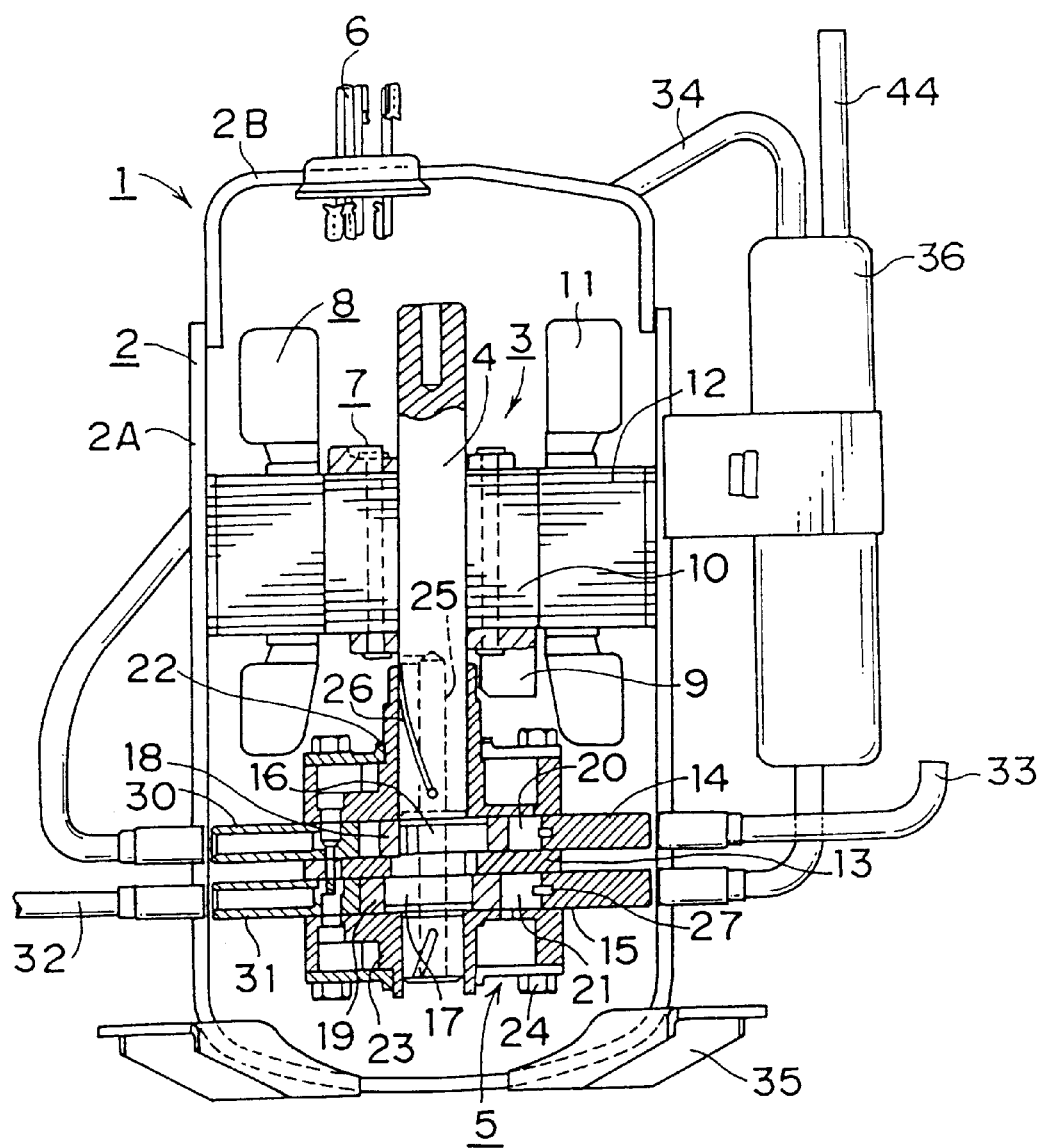
FIG. 2 is a diagram illustrating an example of a compressor used in the refrigerating circuit of the present invention.

The refrigerating device circulates carbon dioxide as a refrigerant through a refrigerating circuit in which at least a refrigerant compressor, a heat releasing device, an expansion mechanism, and an evaporator are connected in a ring by refrigerant pipes. The viscosity of the refrigerating device oil used in the compressor is 5 to 300 cSt at 40° C., and the volume specific resistivity thereof is $10^8$ $\Omega$·cm or more. When the carbon dioxide is dissolved to saturation, the pour point of the refrigerating device oil is -30° C. or less. By using carbon dioxide as the refrigerant and a refrigerating device oil having characteristics similar to those described above as the refrigerating device oil which is sealed in the compressor, the refrigerating device has little effect on the environment, and can remove a large amount of heat. Further, a refrigerating device is realized in which the return of the refrigerating device oil to the compressor is good and in which seizing does not occur.

The refrigerating device of the present invention can be used stably over a long period of time due to the organic materials used in the refrigerating circuit being materials which are not altered physically and/or chemically by high-temperature, high-pressure carbon dioxide.

Further, in accordance with the present invention, a refrigerating device can be realized in which, by providing a drying device at the refrigerating circuit, the generation of rust and the hydrolysis of the refrigerant device oil which are caused by the moisture included in the refrigerating circuit can be prevented.

The refrigerating device of the present invention achieves not only the object of cooling (room cooling or the like), but achieves both functions of cooling (room cooling or the like) and heating (room heating, hot water heating, and the like).

Next, the refrigerating device of the present invention will be described with reference to the drawings.

FIG. 1 is a schematic view for explaining one example of a cooling circuit in the refrigerating device of the present invention. FIG. 1 illustrates one example of a refrigerating circuit in a refrigerating device which is capable of both room cooling and room heating. In FIG. 1, reference numeral 100 represents a refrigerant compressor, 120 denotes a exterior heat exchanger (functioning as a heat releasing device (during room cooling) or as an evaporator (during room heating or heating a substance or the like), 140 represents an expansion mechanism, 160 denotes an interior heat exchanger (functioning as an evaporator during room cooling and as a heat releasing device during room heating (or heating of a substance)), 180 is a four-way valve, and 200 represents a drying device. These respective elements are connected in a ring (in an annular arrangement) by refrigerant pipes. The arrows denote the direction in which the refrigerant flows. The solid line arrows illustrate the flow of the refrigerant when the interior heat exchanger is carrying out room cooling, and the dashed arrows indicate the flow of the refrigerant when the interior heat exchanger is carrying out room heating. In FIG. 1, an example is illustrated in which the drying device is provided between the expansion valve 140 and the interior heat exchanger 160. However, the drying device does not have to be provided at this position, and may be provided at another low-pressure position. Note that the solid lines in FIG. 1 illustrate the position of the drying device during room cooling. A pipe switching section is provided to enable switching of connection of the drying device to the position illustrated by the dashed line during room heating (or heating of a substance).

For example, in a case in which the interior of a room is to be cooled, the refrigerant gas (carbon dioxide), which is under high temperature and high pressure and is compressed by the compressor 100, passes through the four way valve 180, such that heat is released at the exterior heat exchanger 120 and the refrigerant is cooled so as to become a low-temperature, high-pressure refrigerant. The pressure of the refrigerant liquid is lowered by the expansion mechanism (e.g., a capillary pipe, a temperature-type expansion valve, or the like), so as to become a low-temperature, low-pressure liquid containing a slight amount of gas. This liquid reaches the interior heat exchanger 160, obtains heat from the air within the room, evaporates, passes through the four way valve 180 in the state of being a low-temperature gas, and reaches the compressor 100. When the interior of the room is to be heated, the flow of the refrigerant is changed to the opposite direction by the four way valve 180, and the opposite operations are carried out.

Next, an example of the compressor used in the refrigerating device of the present invention will be described. FIG. 2 illustrates an example of a two-cylinder rotary-type compressor (a rotary-type compressor) used in the refrigerating device of the present invention. The carbon dioxide gas which is the refrigerant gas is compressed in two stages.

In FIG. 2, reference numeral 1 is the rotary-type compressor. 2 denotes a sealed container formed from a metal such as iron, and formed by a container body 2A and a sealing lid 2B. An electric element 3, a rotation shaft 4 of the electric element, and a rotating compressing element 5 driven by the rotation shaft 4 are accommodated within the sealed container 2. Reference numeral 6 denotes a terminal end (the wiring between the terminal end and the electric element is not illustrated) which is mounted to the sealing lid 2B and which supplies electric power to the electric element 3.

The electric element 3 is formed by a rotor 7 and a stator 8. The rotor 7 includes a layered body 10 in which a plurality of electromagnetic steel plates are layered, and a plurality of permanent magnets at the interior thereof. The stator 8 is a structure in which a winding 11 is mounted to a layered body 12 in which are layered a plurality of ring-shaped electromagnetic steel plates having a plurality of teeth or a slot at the interior thereof. Reference numeral 9 is a balancer with respect to eccentricity of the rotating compressing element. This structure is called a direct current motor, or is called an induction motor if a known cage-type rotor is used.

The rotating compressing element 5 is formed by a plate middle (intermediate partitioning plate) 13, an upper cylinder 14 and lower cylinder 15 mounted to the top and bottom of the plate middle 13, upper and lower rollers 18, 19 which are rotated within the upper and lower cylinders 14, 15 by upper and lower eccentric portions 16, 17 of the rotating shaft 4, upper and lower vanes 20, 21 which contact the upper and lower rollers 18, 19 and partition the interiors of the upper and lower cylinders 14, 15 into a high pressure chamber and a low pressure chamber, and a main frame 22 and a bearing plate 23 which close off the upper and lower openings of the upper and lower cylinders 14, 15 and permit rotation of the rotating shaft 4.

These elements are disposed in the following order: the main frame 22, the upper cylinder 14, the plate middle 13, the lower cylinder 15, and the bearing plate 23, and are connected by bolts 24.

Further, the rotating shaft 4 is provided with an oil supply hole 25 for supplying lubricating oil, i.e., oil, to the respective sliding portions of the rotating compressing element 5. An oil supply groove 26, which communicates with the oil supply hole 25 and guides oil to the inner sides of the upper and lower rollers 18, 19, is formed at the outer peripheral surface of the rotating shaft 4. Springs 27 for always urging the upper and lower vanes 20, 21 with respect to the upper and lower rollers 18, 19 are provided at the upper and lower vanes 20, 21.

Upper and lower introduction pipes (not illustrated) for introducing the refrigerant are provided at the upper and lower cylinders 14, 15. Upper and lower discharge pipes 30, 31 for discharging the refrigerant, are provided at the upper and lower cylinders 14, 15. Refrigerant pipes 34, 32 are connected to the upper and lower introduction pipes and the upper and lower discharge pipes 30, 31. A refrigerant pipe 33 is connected to the upper cylinder 14.

A refrigerant pipe 44 is a pipe through which refrigerant which has been made into a gas by an overcooling device 42, which will be described later, passes. The refrigerant pipe 34 is joined to the interior of a suction muffler 36. Note that reference numeral 35 is a seat for supporting the sealed container 2.

The refrigerating device oil is held at the bottom portion of the container body 2A of the compressor.

Figure 3:
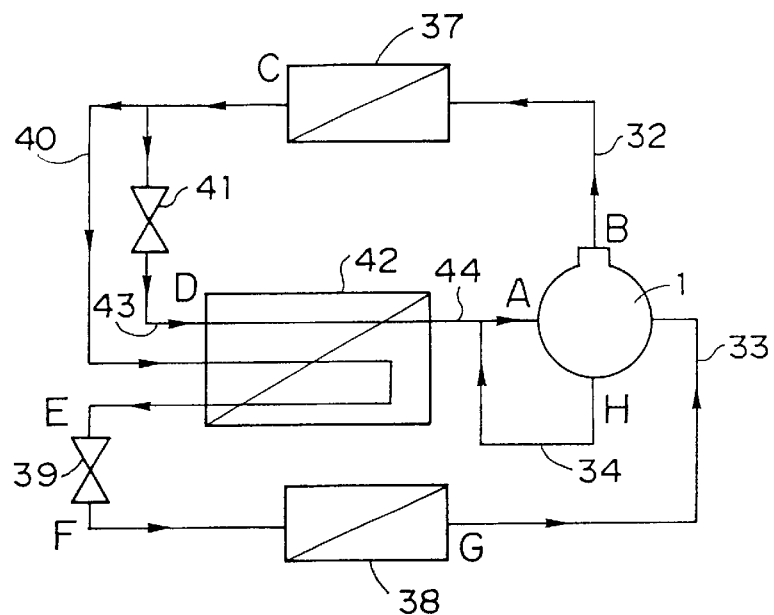
FIG. 3 is a diagram illustrating one example of a refrigerating circuit using the compressor of FIG. 2.

Next, the refrigerating cycle using the two-cylinder rotating compressing device as described above will be described. FIG. 3 is a schematic diagram of a refrigerating cycle using the two cylinder rotating compressing device illustrated in FIG. 2, and illustrates the cycle in one direction from which the four way valve and the drying device have been omitted. In FIG. 3, reference numeral 1 is the two cylinder rotating compressing device, 37 is a gas cooler (a heat releasing device), 38 is an evaporator (a cooling device), 39 is a expansion valve, 41 is a bypass expansion valve, and 42 is an overcooling device. Numerals 32, 33, 40, 41, 43 and 44 are respective refrigerant pipes. The lower discharge pipe 31 provided at the lower cylinder 15 of the rotating compressing device 1 is connected to the gas cooler 37 via the discharge side refrigerant pipe 32. The upper cylinder 14 is connected to the evaporator 38 via a suction side refrigerant pipe 33.

The high-temperature, high-pressure carbon dioxide gas from the compressor 1 (at point B in FIG. 3) is cooled by the gas cooler 37 so as to become low-temperature, high pressure gas (point C in FIG. 3). The low-temperature, high-pressure gas is divided along the way such that one portion thereof flows through the bypass expansion valve 41. The pressure thereof is reduced, such that the gas becomes a low-temperature, low-pressure liquid (see point D), which then passes through the overcooling device 42. This carbon dioxide is evaporated at the overcooling device 42.

The other portion of the refrigerant which is divided off from the refrigerant at point C flows into the refrigerant pipe 40. At the overcooling device 42, the refrigerant which has passed through the bypass expansion valve 41 is evaporated and cooled. For example, the overcooling device 42 is formed by a double tube. The refrigerant from the bypass pipe 43 flows to the inner side, and the refrigerant from the refrigerant pipe 40 flows to the outer side. Or, by reversing this structure, heat exchange can be carried out so as to obtain a lower temperature refrigerant.

The refrigerant which has passed through the bypass expansion valve 41 and the overcooling device 42 flows into the refrigerant pipe 44, merges with the refrigerant from the refrigerant pipe 34 which will be described later, enters into the compressor 1, is compressed by the lower cylinder 15, and is directed toward the refrigerant pipe 32. The refrigerant from the refrigerant pipe 34 is refrigerant which has been compressed by the upper cylinder 14.

At the refrigerating circuit using the above-described two cylinder rotating compressing device, because of the above-described structure, the pressure within the compressor can be made to be an intermediate pressure, and the temperature of the discharge gas from the bypass expansion valve and the overcooling device compressor can be kept low.

In the above-described example, a structure in which the compressor carries out compression in two stages is described. However, in the refrigerating circuit of the present invention, the compressor which is used may carry out compression in one stage.

Figure 4:
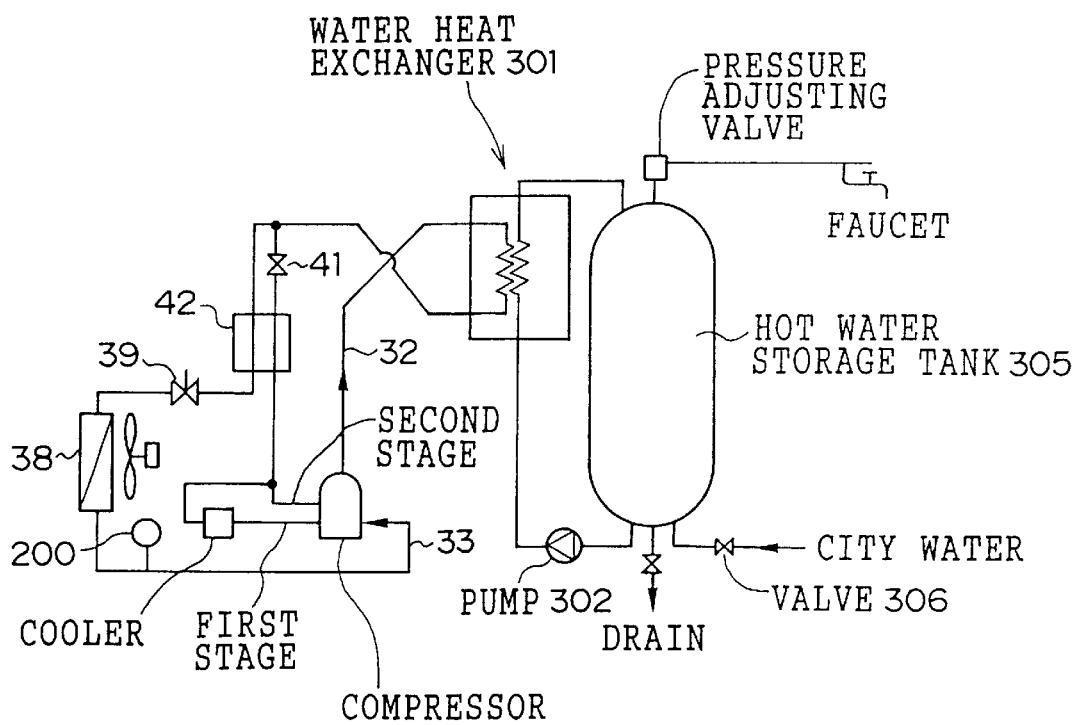
FIG. 4 is a diagram illustrating one example of a hot-water supplying device circuit using the compressor of FIG. 2.

Next, a hot water supplying device cycle, which is one embodiment of the present invention, will be described with reference to FIG. 4. The differences between the cycle of FIG. 4 and the refrigerating cycle of FIG. 3 are that, in FIG. 4, in place of the gas cooler (the heat releasing device) 37, a water heat exchanger 301 is used, and that a water pipe is provided so as to circulate the water or warm water in the tank, which comes out from the bottom portion of a hot water tank 305, to the upper portion of the tank via the water heat exchanger 301 by a pump 302.

Due to this structure, the interior of the hot water storage tank 305 is divided into two sections such that the warm water, which has been heated to a high temperature (about 90° C.) by the water heat exchanger 301, is stored from the upper portion of the hot water storage tank 305, and the low temperature water or warm water is at the lower portion side.

The hot water storage tank 305 is connected after the water pressure of the city water pipes has been adjusted. By using the hot water in the hot water storage tank, when the water pressure in the tank drops, city water is automatically supplied thereto from the bottom of the tank through a valve 306.

Here, as the water heat exchanger, a structure is used in which, after a double tube or two copper pipes are set close together such that heat exchange is possible, they are wound in a spiral shape.

The refrigerating device of the present invention is preferably used in a water heater which removes and utilizes heat from the heat releasing device, an ordinary freezer which carries out cooling by using an evaporator, a refrigerator/freezer, an air conditioner, a dehumidifier, an automatic vending machine, a showcase, and the like.

The purity of the carbon dioxide which is the refrigerant used in the refrigerating device of the present invention is preferably 99.9 vol % or higher, and the total amount of sulfur contained therein is 0.1 wt ppm or less. If the purity is less than 99.9 vol %, there are cases in which effects of the impurities may arise. Thus, a purity at least as great as the above-described level is desirable. Further, if the entire content of sulfur exceeds 0.1 wt ppm, the reaction with the copper forming the pipes will exceed allowable limits, which is not preferable.

The refrigerating device oil is a lubricating oil sealed within the compressor. A mixture of a refrigerant and a small amount of the refrigerating device oil circulates through the entire refrigerating circuit. Accordingly, the low-temperature characteristic and the miscibility with respect to the refrigerant, of the refrigerating device oil are important for the performance of the cooling system. The mixture of the refrigerant and the refrigerating device oil must be stable (e.g., must be resistant to hydrolysis) at operating temperatures of the refrigerating device. Further, the mixture must not be harmful to (e.g., must not be corrosive or lower the insulation of) the compressor as well as the other materials used in the refrigerating circuit.

Further, a portion of the refrigerating device oil is mixed in with the compressed refrigerant gas, is circulated together with the refrigerant in the refrigerating circuit of the refrigerating device, and flows into the evaporator through an expansion mechanism such a capillary pipe or an expansion valve. At the low temperature portions in the refrigerating circuit, the refrigerating device oil which moves from the compressor loses its fluidity, and it is easy for the refrigerating device oil to remain thereat. If the refrigerating device oil does not return to the compressor from the evaporator, the level of the oil surface in the compressor will fall, and scoring or seizing may occur. The viscosity of the refrigerating oil at 40° C. must be 5 to 300 cSt. When the viscosity is greater than 300 cSt, the fluidity is insufficient, and it is easy for the fluidity to be lost especially at low temperatures. Further, if the viscosity is less than 5 cSt, insufficient oil film strength at the lubricating surfaces and an insufficient sealing effect at the compressor mechanism tend to occur.

Further, it is preferable that the solubility of the carbon dioxide with respect to the refrigerating device oil is high.

By using such a refrigerating device oil, when the carbon dioxide is dissolved in the refrigerating device oil, the pour point can be made lower than the original pour point of the refrigerating device oil. In other words, a refrigerating device oil whose pour point when the carbon dioxide gas is dissolved to saturation is −30° C. or less is preferably used.

Further, the volume specific resistivity of the refrigerating device oil at the refrigerating device of the present invention must be $10^8$ Ω·cm or more.

General petroleum oils, ether synthetic oils, ester synthetic oils, fluorine synthetic oils and the like can be used as the refrigerating device oil which satisfies the conditions described above. Examples of petroleum oils are paraffin oils and naphthene oils. Further, polyalkylene glycols, e.g., polyethylene glycol and polypropylene glycol, may be used as the ether synthetic oils. Examples of the ester synthetic oils are polyoyl ester oil, carbonate ester, and the like.

Polypropylene glycol is preferably used as the polyalkylene glycol. Further, a polyester from a polyvalent alcohol and a polyvalent carboxylic acid is preferably used as the ester synthetic oil. Among these, polyester oils synthesized from a fatty acid and a polyvalent alcohol selected from pentaerithritol (PET), trimethoylpropane (TMP), and neopentylglycol (NPG) are preferably used.

Among the refrigerating device oils mentioned above, ether synthetic oils such as polyalkylene glycol or the like are preferably used. Further, a mixture of one or more types of refrigerating device oils may be used as the refrigerating device oil.

Additives such as defoaming agents, antioxidants, moisture- and/or acid trapping agents, extreme pressure additives or anti-abrasion improving agents, and metal inactivating agents, may be added to the refrigerating device oil. In this way, alterations (decomposition, oxidation, formation of sludge, and the like) of the refrigerating device oil can be prevented, which is preferable. In addition, heat-resistance improving agents, corrosion preventing agents, rust-preventing agents and the like may be suitably added.

The additives to the refrigerating device oil do not only have particular effects on the refrigerating device oil itself, but also consequently have certain effects on the sliding portions of the compressor, the insulating materials, and the pipe metals. One or more types of these additives may be used. It is preferable that the additives suppress the deterioration of the functions of the refrigerating device oil in a high-temperature, high-pressure carbon dioxide atmosphere. Further, as described above, because a mixture of the refrigerant and a small amount of refrigerating device oil is circulated through the refrigerating circuit, the refrigerating device oil must not exert any harmful effects on the materials used in the refrigerating circuit.

Further, because carbon dioxide is used as the refrigerant in the present invention, the above-described additives must have stable properties even if a refrigerating circuit using carbon dioxide as a refrigerant is used.

As the defoaming agent, dimethylpolysiloxane oil, trifluoropropylmethyl silicone oil, phenylmethyl silicone oil and the like are preferably used.

The added amount of the defoaming agent is preferably 1 to 50 ppm with respect to the refrigerating device oil. When less than 1 ppm is used, the effects of the defoaming agent are insufficient. If even more than 50 ppm is added, the effects as a defoaming agent do not increase. Therefore, the aforementioned range is preferable.

By adding the defoaming agent, when the air within the refrigerant compressor and the circuit is removed before refrigerant sealing, the amount of foam generated from the refrigerating device oil is decreased, and entry of foam into the deaerating device can be prevented. In addition, foaming occurring at the time when the air dissolved in the refrigerating device oil is removed can be prevented.

The antioxidants may be hindered phenol antioxidants such as ditertiary butylparacresol (DBPC), 2,6-di-t-butyl-4-methylphenol, 4,4'-methylenebis(2,6-di-butylphenol), 2,2'-thiobis(4-methyl-6-t-butylphenol) or the like; amine antioxidants such as p,p'-dioctyldiphenylamine, 3,7-dioctylphenothiazine, phenyl-α-naphthylamine, di(alkylphenyl)amine (wherein the alkyl group has from 4 to 20 carbon atoms), phenyl-α-naphthylamine, alkyldiphenylamine (wherein the alkyl group has from 4 to 20 carbon atoms), N-nitrosodiphenylamine, phenothiazine, N,N'-dinaphthyl-p-phenylenediamine, acridine, N-methylphenothiazine, N-ethylphenothiazine, dipyridylamine, diphenylamine, phenolamine, 2,6-di-t-butyl-α-dimethylaminoparacresol and the like; and sulfur antioxidants such as alkyl disulfides or the like. Among these, DBPC is particularly preferably used.

The added amount of the antioxidant is preferably 0.1 to 0.5 wt % with respect to the refrigerating device oil. When the amount is less than 0.1 wt %, the effects as an antioxidant are insufficient. When an antioxidant is added in an amount exceeding 0.5 wt %, additional effects are not achieved. Thus, the aforementioned range is preferable.

The residual oxygen in the refrigerating circuit is preferably 0.1 vol % or less with respect to the internal volume of the refrigerating circuit.

It is preferable to add a moisture- and/or acid trapping agent to the refrigerating device oil. Water and acidic substances cause corrosion of the metals used in the compressor. In addition, water and acidic substances cause hydrolysis when an ester oil is used as the refrigerating device oil, which frees the fatty acid components. This leads to the possibility of the refrigerating circuit being closed off due to the generation of corrosion or metallic soaps, and of hydrolysis of the ester insulating materials. Epoxy compounds, carbodiimide compounds, and the like may be used as the moisture- and/or acid trapping agent. The epoxy compounds may trap radicals. Examples of the epoxy compounds are glycidyl esters, glycidyl ethers, and the like. For example, a phenylglycidyl ether type epoxy compound or an epoxidated fatty acid monoester or the like may be used. Phenylglycidyl ether or alkylphenylglycidyl ether, for example, may be used. The alkylphenylglycidyl ether has 1 to 3 alkyl groups having 1 to 13 carbon atoms. Examples of the epoxidated fatty acid monoesters are esters of an epoxidated fatty acid having 12 to 20 carbon atoms, and an alcohol having 1 to 8 carbon atoms or a phenol or alkylphenol. In particular, esters of butyl, hexyl, benzyl, cyclohexyl, methoxyethyl, octyl, phenyl or the like of epoxystearic acid are preferable.

The added amount of the moisture- and/or acid-trapping agent is preferably 0.1 to 0.5 wt % with respect to the refrigerating device oil. When the amount is less than 0.1 wt %, the effect as a trapping agent is insufficient. When the amount is greater than 0.5 wt %, it is easy for polymers to be generated. Thus, the above range is preferable.

It is preferable that the residual moisture is 500 ppm or less, and more preferably 200 ppm or less, with respect to the total of the refrigerant and the refrigerating device oil. By using a moisture-trapping agent such as those mentioned above, the equilibrium moisture content within the refrigerating circuit, which content is expressed by the following formula, can be kept to 200 ppm or less in the initial stags of operation of the refrigerating device. When the moisture contents exceeds 500 ppm, it is easy for icing to occur within the capillary pipes. Further, hydrolysis, which is caused when a polyester oil is used as the refrigerating device oil, and the generation of metal soap sludge which accompanies such hydrolysis, can be suppressed.

Formula 1

[(residual moisture amount within refrigerating circuit)/ (amount of oil filled+amount of refrigerant filled)]×$10^6$ ppm For example, a tertiary phosphate phosphorus compound which is thermally stable, such as triphenylphosphate (TPP) or tricresylphosphate (TCP), or the like may be used as the extreme pressure additive. Among these, TCP is particularly preferably used.

The added amount of the extreme pressure additive is preferably 0.1 to 2 wt % with respect to the refrigerating device oil. If the amount is less than 0.1 wt %, the effects as a extreme pressure additive are insufficient. If the added amount exceeds 2 wt %, no additional effects are exhibited, and therefore, the above range is preferable.

Examples of the metal (e.g., copper) inactivating agent are benzotriazole (BTA), triazole, triazole derivatives, thiadiazole, thiadiazole derivatives, dithiocarbonate, alizarin, qunizarin, and the like. Among these, BTA is preferably used.

The added amount of the metal inactivating agent is preferably 1 to 100 ppm with respect to the refrigerating device oil. If the added amount is less than 1 ppm, the effects as a metal inactivating agent are insufficient. If the added amount exceeds 100 ppm, no additional effects are obtained. Therefore, the above range is preferable.

In the refrigerating device of the present invention, carbon dioxide is used as the refrigerant. Thus, materials which are not physically and/or chemically harmed by carbon dioxide must be used as the members forming the refrigerating circuit. In addition, when carbon dioxide is left in a high-pressure state, it sometimes moves to a supercritical state. The carbon dioxide in the compressor which compresses the carbon dioxide under high pressure may change to a supercritical state. In particular, carbon dioxide in a supercritical state has an adverse effect on organic materials. For example, carbon dioxide in a supercritical state easily permeates through organic materials, e.g., silicone resin which is a polymer material. Thus, a sealing material made of silicone resin cannot be used at the compressor. Further, because carbon dioxide in a supercritical state also acts as an organic solvent, there is the concern that the carbon dioxide may permeate into the surface of the material, and physically and/or chemically alter the material. Accordingly, in the compressor as well as the other elements of the refrigerating circuit, organic materials which do not change even if the carbon dioxide goes supercritical must be used as the organic materials used at the portions at which there is the possibly that the carbon dioxide may move to a supercritical state.

Because carbon dioxide is used as the refrigerant in the refrigerating device of the present invention, the refrigerating circuit is exposed to high-temperature, high-pressure carbon dioxide gas. Here, "high-pressure" refers to the pressure at the portions within the refrigerating circuit where the pressure is great, i.e., the discharge pressure of the compressor. Further, "high-temperature" refers to the temperature at the portions where the temperature rises in the refrigerating circuit.

Accordingly, the materials used in the refrigerating circuit must be materials which are not physically and/or chemically altered even when the materials contact the high-temperature, high-pressure carbon dioxide, and even when the carbon dioxide moves to a critical state.

The above "are not physically and/or chemically altered by high-temperature, high-pressure carbon dioxide" means "materials used in the refrigerating circuit are not physically and/or chemically altered even when the materials contact high-temperature, high-pressure carbon dioxide and even when the carbon dioxide moves to a critical state". Such materials should have good resistance to solvents, good non-extractability, good thermal and chemical stability, and good non-foaming property.

Accordingly, among the materials used in the refrigerating circuit, the organic materials must have the property of "not be physically and/or chemically altered by high-temperature, high-pressure carbon dioxide". In particular, organic materials having good resistance to solvents, non-extractability, good thermal and chemical stability, and good non-foaming property are preferable.

For example, the insulative coating material of the windings of the motor of the compressor must also have properties such as those described above. Examples of the insulative coating material include polyvinylformal, polyester, THEIC modified polyester, polyamide, polyamideimide, polyesterimide, polyesteramideimide, and the like. A two-layered covering wire in which the upper layer is polyamideimide and the lower layer is polyesterimide is preferably used.

The insulative film of the motor is preferably formed of a material having similar characteristics. For example, polyethylene terephthalate (PET), polyethylene naphthalate, polyphenylene sulfide (PPS), polyamide and the like may be used. Better effects are achieved when PET is used.

The same holds for the sealing material. Examples of the sealing material are polytetrafluoroethylene, perfluoro elastomers, fluorine-based rubbers, and the like. Better effects are obtained by perfluoro elastomers.

In the refrigerating device of the present invention, the drying device 200 is preferably provided between the expansion mechanism and the evaporator of the refrigerating circuit as shown in FIG. 1. (As mentioned previously, the flow path of the refrigerant is switched at times of cooling and heating.) It is preferable that the drying device 200 is not disposed in series at the refrigerating circuit, and that the drying device 200 is disposed so as to be forked off from the circuit. The reason for this is that, if the drying device is set in series with the circuit, it is easy for the drying agent to be destroyed when the high-pressure refrigerant liquid flows through the drying device. It is preferable to take into consideration the placement of the drying agent such that the drying agent in the drying device is positioned higher, in the vertical direction, than the point of connection (forking-off point) of the drying device with the circuit. This is to prevent the refrigerant from permeating into the drying agent. The drying agent is preferably a synthetic zeolite or the like. Among synthetic zeolites, sodium A type synthetic zeolite and potassium A type synthetic zeolite are preferable. Further, in order for the zeolite particles effectively trap the moisture within the refrigerating circuit, it is preferable for the effective diameter thereof to fall in the range of 3 to 6 Å.

Figure 5:
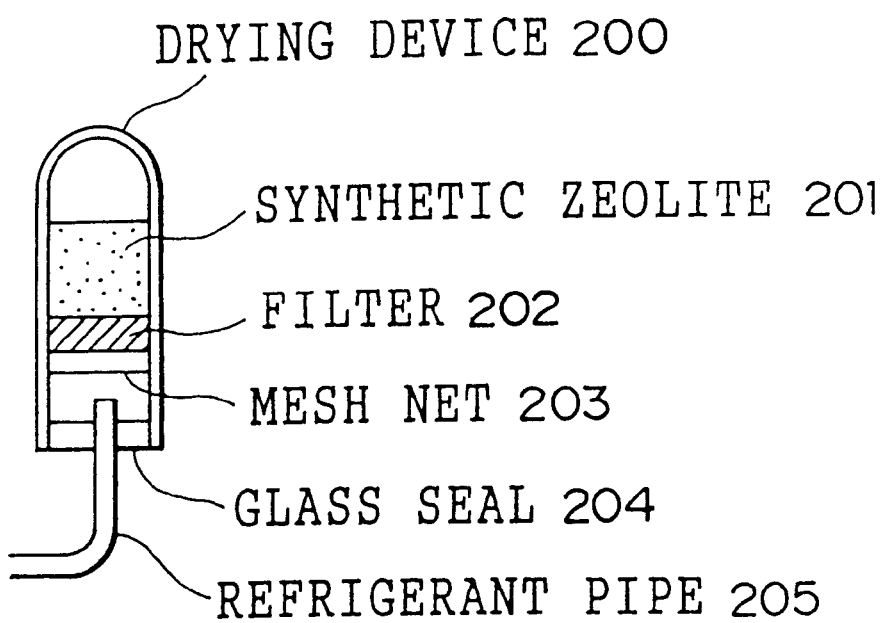
FIG. 5 is a cross-sectional view illustrating one example of a drying device of FIG. 1.

As the drying device used in the refrigerating device, the drying agent may be accommodated within a container, and the container may be connected by a pipe to the refrigerating circuit. A cross-sectional configuration of one example of a drying device used in the present invention is shown in FIG. 5. Reference numeral 201 represents synthetic zeolite, 202 denotes a filter though which water passes, 203 represents a mesh net, and 204 represents a glass seal. Further, reference numeral 205 denotes a pipe for the refrigerant. Hereinafter, the present invention will be described specifically by an Example. However, it is to be noted that the present invention is not limited to this Example.

EXAMPLE 1

A refrigerating device was assembled by using materials such as the following, by using the refrigerating circuit shown in FIG. 1 and the compressor shown in FIG. 2.

refrigerant: carbon dioxide (purity 99.95%)
refrigerating device oil: polypropylene glycol
    viscosity (at 40°): 100 cSt
    volume specific resistivity: $5 \times 10^8$ $\Omega \cdot cm$
    pour point when carbon dioxide is dissolved to saturation: $-70°$ C.
refrigerating device oil additives (added amount is wt % with respect to refrigerating device oil)
    defoaming agent: silicone defoaming agent (10 ppm)
    antioxidant: DBPC (0.3%)
    moisture- and/or acid-trapping agent: epoxy compound (0.25%)
    extreme pressure additive: TCP (1%)
    metal inactivating agent: BTA (5 ppm)
insulative coating material of motor windings: upper layer is polyamideimide; lower layer is polyesterimide
insulative film: PET
O-ring: fluorine-based rubber
drying agent: synthetic zeolite (effective diameter: 3 Å)

When the above refrigerating device was used as a hot water supplying device, a temperature of 100° C. was obtained at the heat releasing portion, and hot water of 80° C. was obtained by thermal exchange. When the refrigerating device was used for cooling, a temperature of $-5°$ C. was obtained at the heat absorbing portion, such that cooling and refrigerating were sufficiently carried out. Further, after operation for 2000 hours, the states of the surfaces of the insulative coating material of the motor windings of the compressor, the insulative film, and the O-ring were inspected, and were found to have no alterations (abnormalities).

As described above, in the refrigerating device of the present invention, by using carbon dioxide as the refrigerant, there is little burden on the environment such as global warming and the destruction of the ozone layer, and high temperatures can be removed from the heat exchanger, and a specific refrigerating device oil is used for the carbon dioxide. Therefore, the return of the refrigerating device oil to the compressor is good, and scoring and seizing of the compressor does not occur. Further, the refrigerating device of the present invention can be stably used over a long period of time.

What is claimed is:

1. A refrigerating device in which carbon dioxide is circulated as a refrigerant in a refrigerating circuit in which at least a refrigerant compressor, a heat releasing device, an expansion mechanism, and an evaporator are connected in an annular arrangement by refrigerant pipes, wherein a refrigerating device oil used in the compressor has a viscosity at 40° C. of 5 to 300 cSt, a volume specific resistivity of $10^8$ $\Omega \cdot cm$ or more, and a pour point of $-30°$ C. or less when the carbon dioxide is dissolved to saturation.

2. The refrigerating device of claim 1, wherein the refrigerating device oil contains an additive which suppresses deterioration of functions of the refrigerating device oil in a high-temperature, high-pressure carbon dioxide atmosphere.

3. The refrigerating device of claim 2, wherein the additive is an antioxidant.

4. The refrigerating device of claim 2, wherein the additive is at least one of a moisture trapping agent or an acid trapping agent.

5. The refrigerating device of claim 2, wherein the additive is a extreme pressure additive.

6. The refrigerating device of claim 2, wherein the additive is a metal inactivating agent.

7. The refrigerating device of claim 1, wherein purity of the carbon dioxide which is the refrigerant is at least 99.9 vol %, and the entire sulfur content of the carbon dioxide is no more than 0.1 wt ppm.

8. The refrigerating device of claim 1, wherein residual oxygen in the refrigerating circuit is no more than 0.1 vol % of an internal volume of the refrigerating circuit, and a residual moisture content in the refrigerating circuit is no more than 500 ppm with respect to a total of the refrigerant and the refrigerating device oil.

9. The refrigerating device of claim 1, wherein the hot water obtained from the heat releasing device is stored in the storage tank and hot water is supplied from the storage tank.

10. A refrigerating device in which carbon dioxide is circulated as a refrigerant in a refrigerating circuit in which at least a refrigerant compressor, a heat releasing device, an expansion mechanism, and an evaporator are connected in an annular arrangement by refrigerant pipes, wherein a refrigerating device oil used in the compressor has a viscosity at 40° C. of 5 to 300 cSt, a volume specific resistivity of $10^8 \Omega \cdot cm$ or more, and a pour point of $-30°$ C. or less when the carbon dioxide is dissolved to saturation, and organic materials used in the refrigerating circuit are materials which are at least physically or chemically unaltered by high-temperature, high-pressure carbon dioxide.

11. The refrigerating device according to claim 10, wherein the material is resistant to solvents, resistant to extraction, thermally and chemically stable, and resistant to foam.

12. The refrigerating device according to claim 10, wherein the material is an insulative coating material of a winding of a motor.

13. The refrigerating device according to claim 12, wherein the insulative coating material of a winding of a motor is selected from the group consisting of polyvinylformal, polyester, THEIC modified polyester, polyamide, polyamideimide, polyesterimide, and polyesteramideimide.

14. The refrigerating device according to claim 10, wherein the material is an insulative film of a motor.

15. The refrigerating device according to claim 14, wherein the insulative film of the motor is selected from the group consisting of polyethylene terephthalate, polyethylene naphthalate, polyphenylene sulfide (PPS), and polyamide.

16. The refrigerating device according to claim 10, wherein the material is a sealing material.

17. The refrigerating device according to claim 16, wherein the sealing material is selected from the group consisting of polytetrafluoroethylene, perfluoro elastomers, and fluorine-based rubbers.

18. The refrigerating device of claim 10, wherein the hot water obtained from the heat releasing device is stored in the storage tank and hot water is supplied from the storage tank.

19. A refrigerating device in which carbon dioxide is circulated as a refrigerant in a refrigerating circuit in which at least a refrigerant compressor, a heat releasing device, an expansion mechanism, and an evaporator are connected in an annular arrangement by refrigerant pipes, wherein a refrigerating device oil used in the compressor has a viscosity at 40° C. of 5 to 300 cSt, a volume specific resistivity of $10^8$ Ω·cm or more, and a pour point of −30° C. or less when the carbon dioxide is dissolved to saturation, and the refrigerating circuit includes a drying device for trapping moisture within the refrigerating circuit.

20. The refrigerating device of claim 19, wherein a drying agent of the drying device is synthetic zeolite.

21. The refrigerating device of claim 19, wherein the drying device is provided one of between the expansion mechanism and the evaporator, and between the expansion mechanism and the heat releasing device.

22. The refrigerating device of claim 19, wherein the drying device is disposed above, in a vertical direction, a point at which the refrigerating circuit is connected to a pipe which connects the refrigerating circuit and the drying device.

23. The refrigerating device of claim 19, wherein the hot water obtained from the heat releasing device is stored in the storage tank and hot water is supplied from the storage tank.

\* \* \* \* \*